United States Patent [19]

Schuhmann et al.

[11] Patent Number: 5,498,474

[45] Date of Patent: Mar. 12, 1996

[54] HEAT-SEALABLE, OPAQUE, BIAXIALLY ORIENTED, MULTILAYER POLYPROPYLENE FILM, PROCESS FOR THE PRODUCTION THEREOF, AND THE USE THEREOF

[75] Inventors: Detlef E. Schuhmann, Kiedrich; Thomas Dries, Schwabenheim; Adolf Wilhelm, Wiesbaden; Dieter Scheidecker, Eltville; Harald Lohmann, Neunkirchen, all of Germany

[73] Assignee: Hoechst Aktiengesellschaft, Frankfurt am Main, Germany

[21] Appl. No.: 238,935

[22] Filed: May 6, 1994

[30] Foreign Application Priority Data

May 6, 1993 [DE] Germany .................. 43 15 006.3

[51] Int. Cl.$^6$ ................................................. B32B 5/16
[52] U.S. Cl. .................. 428/323; 428/327; 428/330; 428/476.9; 428/500; 428/501; 428/507; 428/515; 428/516; 428/688
[58] Field of Search .................. 428/212, 327, 428/330, 331, 461, 476.9, 516, 323, 500, 501, 507, 515, 688

[56] References Cited

U.S. PATENT DOCUMENTS

| | | | |
|---|---|---|---|
| 3,755,249 | 8/1973 | Fujita et al. | 260/45.75 R |
| 4,000,102 | 12/1976 | Shima et al. | 260/23 H |
| 4,230,767 | 10/1980 | Isaka et al. | 428/349 |
| 4,375,989 | 3/1983 | Mäkinen | 106/300 |
| 4,447,271 | 5/1984 | Howard et al. | 106/300 |
| 4,622,237 | 11/1986 | Lori | 427/40 |
| 4,698,261 | 10/1987 | Bothe et al. | 428/204 |
| 4,734,317 | 3/1988 | Bothe et al. | 428/215 |
| 4,780,364 | 10/1988 | Wade et al. | 428/315.5 |
| 5,028,480 | 7/1991 | Dean | 428/314.4 |
| 5,091,236 | 2/1992 | Keller et al. | 428/213 |
| 5,116,897 | 5/1992 | Burton | 524/243 |
| 5,252,384 | 10/1993 | Bothe et al. | 428/212 |
| 5,277,970 | 1/1994 | Schuhmann et al. | 428/323 |

FOREIGN PATENT DOCUMENTS

| | | |
|---|---|---|
| 0236945 | 9/1987 | European Pat. Off. . |
| 0408971 | 1/1991 | European Pat. Off. . |
| 0463517 | 1/1992 | European Pat. Off. . |
| 0515969 | 12/1992 | European Pat. Off. . |
| 3247999 | 6/1984 | Germany . |
| 8710305 U | 12/1987 | Germany . |
| 4228812 | 3/1994 | Germany . |
| 2201407 | 9/1988 | United Kingdom . |

*Primary Examiner*—Patrick J. Ryan
*Assistant Examiner*—William A. Krynski
*Attorney, Agent, or Firm*—Foley & Lardner

[57] ABSTRACT

The invention relates to a multilayer polypropylene film which comprises a base layer K, an interlayer Z and an outer layer D in the structure KZD. The base layer includes propylene polymer or a propylene polymer mixture and filler. The interlayer includes a propylene polymer or a propylene polymer mixture and pigment. The outer layer is heat-sealable and contains a combination of inorganic and/or organic particles and a tertiary aliphatic amine of the formula I:

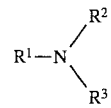

in which $R^1$ is essentially an alkyl radical having at least 18 carbon atoms or an essentially fully saturated alkyl radical having 8 to 26 carbon atoms, and $R^2$ and $R^3$ are identical or different and are $R^4$-$CH_2OH$, in which $R^4$ is an essentially saturated $C_1$-$C_6$-alkyl radical.

18 Claims, No Drawings

HEAT-SEALABLE, OPAQUE, BIAXIALLY ORIENTED, MULTILAYER POLYPROPYLENE FILM, PROCESS FOR THE PRODUCTION THEREOF, AND THE USE THEREOF

BACKGROUND OF THE INVENTION

1. Field of the Invention

The present invention relates to a heat-sealable, opaque, biaxially oriented, multilayer polypropylene film comprising a base layer, and at least one interlayer arranged thereon, and at least one outer layer arranged on the interlayer.

The invention further relates to a process for the production of the multilayer film and to the use of the multilayer film.

2. Description Of Related Art

Opaque films are generally known in the art. EP-A-0 180 087 describes a five-layer heat-sealable film which has a vacuole-containing base layer produced from propylene homopolymer and calcium carbonate, an interlayer of propylene homopolymer and hydrocarbon resin, and heat-sealable outer layers comprising propylene-ethylene copolymers.

The thick interlayer of polypropylene and hydrocarbon resin means that the film has better mechanical properties and higher sheen than films of the known art. In addition, the film is readily corona-treated due to the embossed heat-sealing layers of propylene-ethylene copolymers. The film has unsatisfactory sheen, whiteness and opacity.

EP-A-0 312 226 discloses an opaque multilayer film having one outer layer which comprises a readily printable polymer, an interlayer of propylene homopolymer and a base layer containing vacuoles. The film is distinguished by high sheen as seen from the homopolymer side. Due to the disclosed layer thickness ratios, the surface sheen, the opacity and the whiteness are unsatisfactory, as is the case with EP-A-0 180 087.

EP-A-0 408 971 describes a film of high whiteness and high opacity which is readily printable and is said to have sheen. However, the sheen is unsatisfactory due to the large thickness of the outer layer. The film can have a cloudy structure, probably due to the small particle size of the calcium carbonate used. The particle size of 1.0 μm given as a preferred size results in poor dispersibility in the polymer. In addition, the increased fines content of the particles results in reduced opacity, since no vacuoles are formed.

All the known opaque films mentioned above particularly, have the disadvantage of poor antistatic properties and very poor destackability. In addition to their conventional use as packaging films, opaque films are also used as label materials. To be used as labels, the film is cut into pieces of suitable size and stacked one on top of the other. In the labeling process, the individual film pieces are removed from this stack by machine and fed to the labeling process. In the case of conventional opaque films, problems frequently occur in this machine destacking operation if the machine frequently grasps more than one sheet. As discussed above, conventional opaque films have very poor antistatic properties, which results in contamination of the surface by accumulation of dust, and also represents a potential hazard in the case of extreme charging, due to the large surface area of the film. For example, due to sudden discharging in a printing machine, a dangerous situation such as an explosion of solvents could occur.

The known finishing of the base layer with antistatics does not improve the antistatic properties of the film to a sufficient extent. The incorporation of corresponding additives into the outer layer results in production problems due to evaporation. The antistatics deposit in the tenter frame and on the rolls and result in interfering contaminants. In addition, the finally produced film does not contain the intended amount of antistatics.

In addition, known films have unsatisfactory antistatic properties after printing. The films are usually printed over the entire area with a base color, generally white, before application of a colored print image. It has been found that this full-area printing of the film results in a considerable impairment of the antistatic properties, particularly in the case of white full-area printing.

SUMMARY OF THE INVENTION

One object of the present invention is to provide a film which overcomes the disadvantages of the films previously described in the prior art. In particular, one object of the invention is to provide a multilayer film which is readily printable, has good antistatic properties, has desirable further-processing properties and good destackability. It is also an object of the invention to provide a film which has retention of the desirable antistatic and further-processing properties (for example, during cutting, winding, stamping or the like) even after printing.

It is another object of the present invention to provide a process for the production of the multilayer polypropylene film by a coextrusion process. Still another object of the present invention is to provide label made from the multilayer polypropylene film.

In accomplishing the foregoing objects, there has been provided according to one aspect of the present invention, a heat-sealable, biaxially oriented, opaque, multilayer polypropylene film comprising: a base layer which comprises a propylene polymer or propylene polymer mixture and fillers; an interlayer(s) which comprise(s) a propylene polymer or a propylene polymer mixture and pigment; and an outer layer(s) which comprise(s) copolymers and/or terpolymers of α-olefins having 2 to 10 carbon atoms.

In a preferred embodiment, the film comprises a base layer which comprises a propylene polymer or a propylene polymer mixture and filler; and at least one interlayer arranged thereon; and at least one heat-sealable outer layer arranged on the interlayer, wherein the outer layer comprises a combination of inorganic and/or organic particles and a tertiary aliphatic amine of the formula I:

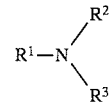

in which $R^1$ is essentially an alkyl radical having at least 18 carbon atoms or an essentially fully saturated alkyl radical having 8 to 26 carbon atoms, and $R^2$ and $R^3$ are identical or different and are $R^4\text{-CH}_2\text{OH}$, in which $R^4$ is an essentially saturated $C_1$–$C_6$-alkyl radical, and wherein the interlayer comprises a propylene polymer or a propylene polymer mixture and pigment.

In another preferred embodiment, the outer layer contains from about 0.05 to 2% by weight of the tertiary aliphatic amine of the formula I and from about 2 to 8% by weight of inorganic and/or organic particles, in each case based on the weight of the outer layer.

Preferably, the outer layer contains inorganic particles, especially $CaCO_3$, having a particle size from about 2 to 5 µm.

In another preferred embodiment, the fillers of the base layer comprise vacuole-inducing solid particles having a mean particle diameter of $\geq$ about 1 µm and/or pigments having a mean particle diameter of < about 1 µm.

There is also provided according to another aspect of the present invention, a label comprising the multilayer polypropylene film shaped in the configuration of a label.

There is further provided according to another aspect of the present invention a process for the production of the film comprising the steps of: coextruding melts corresponding to the individual layers of the film through a flat-film die; cooling the extruded film for solidification; biaxially stretching the film; and optionally corona treating or polarized flame treating the stretched film on one or both surfaces.

Further objects, features and advantages of the present invention will become apparent to persons skilled in the art from the detailed description of preferred embodiments which follows.

DETAILED DESCRIPTION OF THE PREFERRED EMBODIMENTS

The present invention comprises a multilayer film of the generic type described above, where the outer layer contains a combination of inorganic and/or organic particles and tertiary aliphatic amine of the formula I:

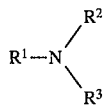

in which $R^1$ is preferably an alkyl radical having at least 18 carbon atoms or a fully saturated alkyl radical having 8 to 26 carbon atoms, and $R^2$ and $R^3$ are identical or different and comprise $R^4\text{-}CH_2OH$, in which $R^4$ is preferably a saturated $C_1\text{-}C_6$-alkyl radical, and where the interlayer comprises propylene polymer or a propylene polymer mixture and pigment.

The film according to the invention has at least three layers and always contains, as essential layers, the base layer K and at least one interlayer Z and at least one outer layer D, with the structure KZD. The choice of the number of layers depends primarily on the proposed application. Particular preference is given to four- and five-layered embodiments with the structure DZKZD or the asymmetrical structure DKZD (where D represents the same or different polymer compositions in each outer layer).

The overall thickness of the film can vary within broad limits and depends on the intended application. The preferred embodiments of the film according to the invention have overall thicknesses from about 10 to 140 µm, preferably from about 20 to 120 µm, more preferably from about 30 to 100 µm.

The thickness of each interlayer are independent of each other and range from about 2 to 12 µm, preferably from about 3 to 8 µm, more preferably from about 3 to 6 µm. The values given in each range relate to one interlayer.

The outer layer(s) generally has a thickness from about 0.5 to 5 µm, preferably from about 0.5 to 3 µm, more preferably from about 0.7 to 1.5 µm. The thicknesses of outer layers present on both sides are each selected independently of one another.

The thickness of the base layer is obtained correspondingly from the difference between the overall thickness and the thickness of the outer layer(s) and interlayer(s) applied, and can therefore vary within broad limits analogously to the overall thickness.

The base layer of the multilayer film according to the invention preferably comprises a propylene polymer or a propylene polymer mixture and a filler.

The propylene polymer of the base layer comprises predominantly (at least about 90%) propylene and has a melting point from about 140° C. or above, preferably from 150° to 170° C. Isotactic homopolypropylene having an n-heptane-soluble content of about 6% by weight or less, based on the isotactic homopolypropylene, copolymers of ethylene and propylene having an ethylene content of about 10% by weight or less, copolymers of propylene with $C_4\text{-}C_8\text{-}\alpha$-olefins having an $\alpha$-olefin content of about 10% by weight or less are preferred propylene polymers for the base layer. Isotactic homopolypropylene is particularly preferred. The percentages by weight stated relate to the particular copolymer. The propylene polymer of the base layer generally has a melt flow index from about 0.5 g/10 min to 8 g/10 min, preferably from about 2 g/10 min to 5 g/10 min at 230° C. and a force of 21.6N (DIN 53 735).

Also suitable is a mixture of said propylene homopolymers and/or copolymers and/or other polyolefins which are compatible with the propylene polymers. Preferably, the polyolefins have 2 to 6 carbon atoms. The mixture contains at least about 50% by weight, preferably at least about 75% by weight, of propylene polymer. Other polyolefins which are suitable in the polymer mixture are compatible polyethylenes, in particular HDPE, LDPE and LLDPE, where the proportion of these polyolefins is in each case at most about 15% by weight, based on the polymer mixture. "Compatible" for the purposes of the present invention means that the compatible polymer is not in the form of a separate phase in the film.

The propylene polymer employed in the base layer may be partially degraded by addition of organic peroxides. A measure of the degree of degradation of the polymer is the degradation factor A, which gives the relative change in the melt flow index of the polypropylene based on the starting polymer, measured in accordance with DIN 53 735:

$$A = \frac{MFI_2}{MFI_1}$$

$MFI_1$ = melt flow index of the propylene polymer before addition of the organic peroxide $MFI_2$ = melt flow index of the propylene polymer degraded by peroxide.

In general, the degradation factor A of the propylene polymer employed is in the range from about 3 to 15, preferably from about 6 to 10.

Particularly preferred organic peroxides are dialkyl peroxides, where the term alkyl radical is defined as a conventional saturated, straight-chain or branched lower alkyl radical having up to six carbon atoms. Particular preference is given to 2,5-dimethyl-2,5-di(t-butylperoxy)hexane and di-t-butyl peroxide.

The polypropylene base layer generally contains one or more fillers in an amount from about 1 to 30% by weight which makes the film opaque. For the purposes of the present invention, "opaque film" means a non-transparent film whose transparency to light (ASTM-D 1003-77) is at most about 50%, preferably at most about 70%.

For the purposes of the present invention, the term "fillers" is taken to mean vacuole-inducting solid particles, referred to below as "solid particles", and "pigments". Solid particles are incompatible with the polymer matrix and result in the formation of vacuole-like cavities when the film is stretched. The size, type and number of the vacuoles are dependent on the size of the solid particles and the stretching conditions, such as stretching ratio and stretching temperature. The vacuoles give the films a characteristic pearl-like opaque appearance, caused by light scattering at the "vacuole-polymer matrix" interfaces. Light scattering at the solid particles themselves generally contributes comparatively little to the opacity of the film. In general, solid particles have a minimum size of about 1 μm in order to give an effective, i.e., opacifying, size and number of vacuoles. In general, the mean particle diameter of the solid particles is from about 1 to 6 μm, preferably from about 1.5 to 5 μm. The chemical character of the solid particles plays a minor role.

Pigments are likewise incompatible with the polymer matrix and include fillers which result in virtually no vacuole formation on stretching. The coloring action of the pigments is caused by the particles themselves. The term "pigment" is generally associated with a particle size of from about 0.01 μm to a maximum of 1 μm and covers both so-called "white pigments", which color the films white, and "colored pigments" which give the film a colored or black color. In general, the mean particle diameter of the pigments is in the range from about 0.01 to 1 μm, preferably from about 0.01 to 0.5 μm.

The division of the fillers into the two groups "solid particles" and "pigments" is therefore a classification by functionality, which depends, inter alia, on the particle size. Solid particles make films opaque due to vacuole formation. Pigments color the film and thus make it non-transparent. Particles of both types are covered by the generic term "fillers".

Conventional fillers in the base layer are inorganic and/or organic, polypropylene-incompatible materials, such as aluminum oxide, aluminum sulfate, barium sulfate, calcium carbonate, magnesium carbonate, silicates, such as aluminum silicate (kaolin clay) and magnesium silicate (talc), silicon dioxide and titanium dioxide, of which calcium carbonate, silicon dioxide and titanium dioxide are preferred. Suitable organic fillers are the conventional polymers which are incompatible with the polymer of the base layer, particularly those such as HDPE, polyesters, polystyrenes, polyamides and halogenated organic polymers. Preference is given to polyesters, such as polybutylene terephthalates. For the purposes of the present invention, "incompatible materials or incompatible polymers" is defined as the material or polymer is in the form of a separate particle or a separate phase in the film.

All amount data below regarding the amounts of filler in the base layer are in percent by weight (% by weight) and are based on the weight of the base layer.

The amount of filler in the base layer is generally in the range from about 1 to 30% by weight. Individual embodiments may contain only solid particles or only pigments or a combination of solid particles and pigments in the base layer and depends on the intended application of the film or the current fashion.

Films provided only with pigment (pigmented films) generally contain this pigment in an amount of about 2 to 25% by weight, preferably from about 3 to 20% by weight, more preferably from about 5 to 15% by weight. Preferred pigments are white pigments, particularly $TiO_2$ and $BaSO_4$. $TiO_2$ preferably has a mean particle diameter from about 0.01 to 0.7 μm, in particular from about 0.01 to 0.4 μm.

Films provided only with vacuole-inducing solid particles generally contain these in an amount from about 1 to 25% by weight. For general packaging films, a content of solid particles from about 2 to 5% by weight is preferred. For specific applications, for example films for labels, highly filled films containing from about 9 to 14% by weight of solid particles are also preferred. Preferred vacuole-inducing particles are $CaCO_3$, $SiO_2$, polyamides and polybutylene terephthalates. Particular preference is given to $CaCO_3$, particularly $CaCO_3$ having a mean particle diameter from about 1 to 5 μm, preferably from about 2 to 5 μm. For the present invention, preferred embodiments are those having a highly filled base layer, where the base layer advantageously contains from about 9 to 14% by weight of $CaCO_3$ having a mean particle diameter from about 1 to 5 μm, preferably from about 2 to 5 μm.

Films provided with both vacuole-inducing solid particles and pigment contain solid particles in an amount from about 1 to 10% by weight, preferably from about 1 to 5% by weight. Pigment is present in an amount from about 1 to 7% by weight, preferably from about 1 to 5% by weight. For films of these types, a combination of $CaCO_3$ as solid particles and $TiO_2$ as pigment is preferred. This type of film is also known as opaque white film.

The density of the filler-containing films can vary within broad limits and depends on the type and amount of fillers. The density is generally in the range from about 0.4 to 1.1 g/cm$^3$.

Pigmented films have a density in the order of about 0.9 g/cm$^3$ or above, since the pigments generate virtually no density-reducing vacuoles, but the pigments themselves can have a higher density than polypropylene. The density of films of this type is preferably in the range from about 0.9 to 1.1 g/cm$^3$.

Films containing only solid particles have a reduced density compared with polypropylene of less than 0.9 g/cm$^3$, due to the vacuoles. For packaging films having a typical content of solid particles from about 2 to 5% by weight, the density is in the range from about 0.7 to 0.85 g/cm$^3$. For films having a highly filled base layer having a content of solid particles from about 9 to 14% by weight, as is preferred for the present invention, the density is in the range from about 0.4 to 0.7 g/cm$^3$.

Films containing both pigments and solid particles, in particular white, opaque films, have a density in the range from about 0.6 to 0.85 g/cm$^3$. This ratio depends on the ratio between the pigment content and the content of solid particles.

Preferred embodiments of the pigmented films contain $TiO_2$ as white pigment. $TiO_2$ is likewise preferred for white, opaque film types. The titanium dioxide particles comprise at least 95% by weight of rutile and are preferably employed with a coating of inorganic oxides. The oxides employed are usually used as a coating for $TiO_2$ white pigment in papers or paints in order to improve the light fastness. Particularly suitable inorganic oxides include the oxides of aluminum, silicon, zinc and magnesium or mixtures of two or more of these compounds. They are precipitated from water-soluble compounds, for example alkali metal aluminate, in particular sodium aluminate, aluminum hydroxide, aluminum sulfate, aluminum nitrate, sodium silicate or silicic acid, in aqueous suspension. Coated $TiO_2$ particles are described, for example, in EP-A-0 078 633 and EP-A-0 044 515, the disclosures of which are hereby incorporated by reference.

The coating may also contain organic compounds containing polar and nonpolar groups. Preferred organic compounds are alkanols and fatty acids having 8 to 30 carbon atoms in the alkyl group, in particular fatty acids and primary n-alkanols having 12 to 24 carbon atoms, and polydiorganosiloxanes and/or polyorganohydrosiloxanes, such as polydimethylsiloxane and polymethylhydrosiloxane.

The coating on the $TiO_2$ particles usually comprises from about 1 to 12 g, preferably from about 2 to 6 g, of inorganic oxides. Additionally from about 0.5 to 3 g, preferably from about 0.7 to 1.5 g, of organic compounds, can be used if desired. In each base, the weights are based on 100 g of $TiO_2$ particles. It has proven particularly advantageous for the $TiO_2$ particles to be coated with $Al_2O_3$ or with $Al_2O_3$ and polydimethylsiloxane.

The base layer may furthermore contain a resin in a proportion from about 1 to 30% by weight, preferably from about 2 to 10% by weight, based on the base layer. The softening point of the resin is between about 100° and 180° C. (measured in accordance with DIN 1995-U4, corresponding to ASTM E-28), preferably between about 130° and 160° C. Of the numerous resins, low-molecular-weight resins and hydrocarbon resins are preferred, in particular in the form of petroleum resins, styrene resins, cyclopentadiene resins and terpene resins (these resins are described in Ullmanns Encyklopädie der techn. Chemie [Ullmann's Encyclopedia of Industrial Chemistry], 4th Edition, Volume 12, pages 525 to 555). Suitable petroleum resins are described below in connection with the interlayer.

The film according to the invention is provided with an interlayer on at least one side of the base layer, if desired, on both sides. The interlayers on both sides may be identical or different with respect to their structure (polymer), their composition (additives) and their thickness.

This (these) interlayer(s) preferably comprise(s) propylene polymer or propylene polymer mixtures, as described above for the base layer. Basically, the base layer and the interlayer(s) can be built up from identical or different propylene polymers or mixtures. The melt flow indices of the polymers for the base layer and the interlayer(s) should be the same if possible. If necessary, the MFI of the interlayer(s) can be somewhat higher, with a maximum difference of about 20%.

In a particularly advantageous embodiment, the propylene polymers employed in the interlayer are partially degraded by the addition of organic peroxides in the same way as described above for the base layer. The degradation factor A of the propylene polymer employed in the interlayer is in the range from about 3 to 15, preferably from about 6 to 10. The observance of this range is particularly favorable for the desired sheen properties of the film.

According to the invention, the interlayer contains a pigment, optionally in combination with a resin if desired. Suitable pigments are in principle the same pigments as described above for the base layer. $TiO_2$, $BaSO_4$, $Al_2(SO_4)_3$ and $CaSO_4$ are preferred. The pigment $TiO_2$ is particularly preferred. The interlayer(s) generally contain(s) pigments, preferably $TiO_2$, in an amount from about 4 to 15% by weight, preferably from about 5 to 12% by weight, in each base based on the interlayer.

The information in the description concerning the pigments in the base layer applies in the same way to the pigments of the interlayer. The base layer and interlayer may contain identical or different (with respect to particle or coating type or particle size) pigments.

Furthermore, the addition of a resin in combination with $TiO_2$ is preferred. The resin is present in an amount from about 1 to 30% by weight, preferably from about 2 to 10% by weight, based on the weight of the inter layer. The softening point of the resin is between about 100° and 180° C. (measured in accordance with DIN 1995-U4, corresponding to ASTM E-28), preferably from about 120° to 160° C. Of the numerous resins, low-molecular-weight resins and hydrocarbon resins are preferred, particularly in the form of petroleum resins, styrene resins, cyclopentadiene resins and terpene resins (these resins are described in Ullmanns Encyklopädie der techn. Chemie [Ullmann's Encyclopedia of Industrial Chemistry], 4th Edition, Volume 12, pages 525 to 555).

The petroleum resins are those hydrocarbon resins prepared by polymerization of deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene and pentylene. The styrene resins are low-molecular-weight homopolymers of styrene or copolymers of styrene with other monomers, such as methylstyrene, vinyltoluene and butadiene. The cyclopentadiene resins are cyclopentadiene homopolymers or cyclopentadiene copolymers obtained from coal tar distillates and fractionated petroleum gas. These resins are prepared by keeping the materials containing cyclopentadiene at high temperature for long periods of time. Depending on the reaction temperature, dimers, trimers or oligomers can be obtained.

The terpene resins are polymers of terpenes, i.e., hydrocarbons of the formula $C_{10}H_{16}$, which are present in virtually all essential oils or oil-containing resins from plants, and phenol-modified terpene resins. Specific examples of terpenes which may be mentioned are pinene, α-pinene, dipentene, limonene, myrcene, camphene and similar terpenes.

Hydrocarbon resins employed are also styrene homopolymers, styrene copolymers, cyclopentadiene homopolymers, cyclopentadiene copolymers and/or terpene polymers having a softening point of in each case above 135° C. (in the base of unsaturated polymers, the hydrogenated product is preferred). Particular preference is given in the interlayers to cyclopentadiene polymers having a softening point of 140° C. or above.

The hydrocarbon resins can also be so-called modified hydrocarbon resins. The modification is generally carried out by reaction of the raw materials before the polymerization, by the introduction of specific monomers or by reaction of the polymerized product, in particular by hydrogenation or partial hydrogenation.

In addition to the pigment according to the invention and any resin present, the interlayer may also contain further conventional additives, preferably lubricants, stabilizers and neutralizers.

The film according to the invention has at least one outer layer applied to the interlayer. If desired, a further outer layer may be present, applied either to the base layer or to any second interlayer present. Outer layers on both sides can have identical or different structures, compositions and thicknesses.

The outer layer of the multilayer film according to the invention comprises a heat-sealable polymer and a combination of inorganic and/or organic particles and a tertiary aliphatic amine of the formula I:

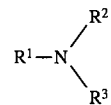

in which $R^1$ is preferably an alkyl radical having at least 18 carbon atoms or a fully saturated alkyl radical having 8 to 26 carbon atoms, and $R^2$ and $R^3$ are identical or different and comprise $R^4$-$CH_2OH$, in which $R^4$ is preferably a saturated $C_1$–$C_6$-alkyl radical.

For the purposes of the present invention, heat-sealable polymers comprise
copolymers of
ethylene and propylene or
ethylene and butylene or
propylene and butylene or
ethylene and another α-olefin having 5 to 10 carbon atoms or
propylene and another α-olefin having 5 to 10 carbon atoms or
terpolymers of
ethylene and propylene and butylene or
ethylene and propylene and another α-olefin
having 5 to 10 carbon atoms or a mixture or blend of two or more of said copolymers and/or terpolymers.

The heat-sealable polymers of the outer layer(s) preferably comprise(s)
a copolymer of
ethylene and propylene or
ethylene and 1-butylene or
propylene and 1-butylene or
a terpolymer of
ethylene and propylene and 1-butylene or a mixture or blend of two or more of said particularly preferred copolymers and/or terpolymers.

Particular preference is given to random ethylene-propylene copolymers having
an ethylene content from about 2 to 10% by weight, preferably from about 5 to 8% by weight, or
random propylene-1-butylene copolymers having a butylene content from about 4 to 25% by weight, preferably from about 10 to 20% by weight,
in each base based on the total weight of the copolymer, or random ethylene-propylene-1-butylene terpolymers having
an ethylene content from about 1 to 10% by weight, preferably from about 2 to 6% by weight, and
a 1-butylene content from about 3 to 20% by weight, preferably from about 8 to 10% by weight,
based on the total weight of the terpolymer, or
a mixture or blend of an ethylene-propylene-1-butylene terpolymer and a propylene-1-butylene copolymer having an ethylene content from about 0.1 to 7% by weight and a propylene content from about 50 to 90% by weight and a 1-butylene content from about 10 to 40% by weight,
based on the total weight of the polymer mixture.

The above-described outer layer polymers can also be degraded by peroxide in an analogous manner as described above for the base layer, in principle using the same peroxides as described above for the degradation. The degradation factor A of the outer layer polymer(s) is generally in the range from about 3 to 15, preferably from about 6 to 10.

In principle, the heat-sealable polymers can also be heat-sealable homopolymers. These heat-sealable homopolymers are distinguished by a particular structure and completely new properties compared with the conventional, known, isotactic, non-heat-sealable homopolymers. Such materials are described in DE-A-42 28 812 and EP-A-0 484 816, which references are hereby incorporated in their entirety.

Surprisingly, it has been found that outer layers containing a selected aliphatic amine of the formula I in combination with an inorganic and/or organic particle have excellent antistatic properties and very good destackability.

Tertiary aliphatic amines are known per se from the known art. Surprisingly, however, only the amines which have the specific structure indicated by the formula I interact in the desired manner with the inorganic and/or organic particles to give the desired results of the present invention.

It has been found that the conventional use of tertiary aliphatic amines as antistatics in the base layer does not bring the desired antistatic properties to the required extent. The use of antistatics in the outer layer results in problems in the production process, since the amine forms considerable deposits on the rolls and only a fraction of the amount originally employed appears in the finally produced film. The antistatic properties of the film are inadequate.

Surprisingly, these problems do not occur if the selected amines of the formula I are used. In spite of incorporation of the additive into the outer layer, there is no evaporation or deposition on the rolls. The concentration of the amine in the outer layer corresponds to the amount originally employed.

Preferred tertiary aliphatic amines of the formula I are those in which
$R^1$ is essentially $C_{18}$–$C_{30}$-, preferably $C_{18}$–$C_{26}$-alkyl radical or an essentially hydrogenated $C_{12}$–$C_{18}$-alkyl radical, and
$R^2$ and $R^3$ are identical or different and are $R^4$-$CH_2OH$, in which $R^4$ is an essentially saturated $C_1$–$C_3$-alkyl radical.

Alkyl radicals are defined as straight-chain or branched hydrocarbon radicals, which may basically be saturated or unsaturated.

For the purposes of the present invention, "essentially" means that, in addition to the stated meaning for the radical $R^1$, small amounts, i e , less than about 10%, based on the total amount of amine, of other chain lengths may also be present, particularly shorter chain lengths. In other words, a certain amount of tertiary aliphatic amine contains a chain-length distribution for the alkyl radicals of the individual substituents, so that, for example, small amounts of $C_{16}$ or $C_{14}$ can also be found for $R^1$ in addition to $C_{18}$-alkyl radicals for $R^1$.

For the purposes of the present invention, "essentially saturated" or "essentially hydrogenated" means that the degree of saturation of the alkyl radicals is at least about 90%, preferably greater than about 95%.

Tertiary aliphatic amines of the formula I which have proven very particularly effective for the present invention are those in which
$R^1$ is essentially $C_{18}$–$C_{20}$-alkyl, preferably $C_{18}$-alkyl, and
$R^2$ and $R^3$ are essentially $CH_2$-$CH_2OH$, other amines of the formula I which have proven particularly effective are those in which
$R^1$ is from about 55 to 65% $C_{18}$-alkyl from about 30 to 40% $C_{16}$-alkyl from about 0 to 5% $C_{14}$-alkyl and from about 0 to 1% $C_{12}$-alkyl,
where all alkyl radicals are essentially saturated, and in which $R^2$ and $R^3$ are $CH_2$-$CH_2OH$.

It is essential to the invention that the outer layer(s) furthermore contain(s) inorganic and/or organic particles in combination with the tertiary aliphatic amine(s).

For the purposes of the invention, particles are defined as particles which are incompatible with the outer layer polymer and are present in the film as separate particles unaffected by the film production process.

Inorganic particles are defined as those which are described above as inorganic fillers for the base layer. Preferred inorganic particles are $CaCO_3$, $SiO_2$, $TiO_2$, silicates and phosphates of Ca and Mg, or mixtures of these particles.

The outer layer(s) generally contain(s) from about 2 to 8% by weight, based on the weight of the outer layer, of inorganic and/or organic particles. The preferred particle content of the outer layer is from about 4 to 6% by weight. The mean particle size is between about 1 and 6 μm, in particular between about 2 and 4 μm, preference being given to particles having a spherical shape. In a particularly advantageous embodiment of the invention, the base layer and the outer layer contain the same additives, preferably $CaCO_3$ and/or $TiO_2$. This enables easy recycling of film scrap produced during film production back into the production process.

In principle, suitable particles for the outer layer are also organic materials, such as those described above as organic fillers for the base layer.

The particle content of the outer layer and the filler content of the base layer gives a total content of fillers from about 5 to 30% by weight, based on the total weight of the film. The multilayer film preferably contains from about 5 to 25% by weight of filler, based on the total weight of the film.

Surprisingly, the combination of the tertiary aliphatic amine selected with particles for the outer layer significantly improves the destackability and the antistatic properties of the film. These functions play an important part when the film according to the invention is used as a label.

It is also surprising that the modification of the outer layer by means of said additives does not impair the visual appearance of the film. The film has excellent sheen values and the desired decorative pearl-like effect in spite of the fillers present. In spite of the relatively high content of particles in the outer layer, the film unexpectedly has good heat-sealing properties. This is particularly surprising since it is known that the addition of $CaCO_3$ to the base layer results in vacuole formation during stretching, i.e., the structure of the polymer matrix is significantly changed. The effect of the filler on the structure of the outer layer polymer is not yet fully understood. However, it has been found that the heat-sealability of the film is unexpectedly good in spite of the filler-containing outer layer.

It has also surprisingly been found that, in spite of the filler introduced into the outer layer, the film does not exhibit the "chalking" known from uncoated opaque films. It is known that single-layer films containing, for example, $CaCO_3$ in comparable amounts to the outer layer have a white dust layer which forms with time from the film. This white dust is caused by $CaCO_3$ which has separated out, if the $CaCO_3$-containing layer is not coated. This process is generally known as "chalking". This separation also contaminates rolls during production or processing of the film. It was entirely unexpected that no "chalking" problems occur in the film according to the invention, even though the "outer" layer contains considerable amounts of $CaCO_3$.

In order to improve the adhesion properties of the outer layer(s), at least one surface of the film is corona- or flame-treated. If desired, the corresponding treatment can be carried out on both surfaces and can be the same or different.

In order further to improve specific properties of the polyolefin film according to the invention, both the base layer and the outer layer(s) may further contain effective amounts of additives. Preferred additives are antiblocking agents and/or lubricants and/or stabilizers and/or neutralizers, which are compatible with the propylene polymers of the base layer and of the outer layer(s), with the exception of the antiblocking agents, which are generally incompatible. All amount data hereinafter in percent by weight (% by weight) in each base relate to the layer or layers to which the additive can be added.

Suitable antiblocking agents are inorganic additives, such as silicon dioxide, calcium carbonate, magnesium silicate, aluminum silicate, calcium phosphate and the like and/or incompatible organic polymers, such as polyamides, polyesters, polycarbonates and the like. Preference is given to benzoguanamine-formaldehyde polymers, silicon dioxide and calcium carbonate. The effective amount of antiblocking agent is in the range from about 0.1 to 2% by weight, preferably from about 0.1 to 0.5% by weight. The mean particle size is between about 1 and 6 µm, in particular about 2 and 5 µm. Particularly suitable are particles having a spherical shape, as described in EP-A-0 236 945 and DE-A-38 01 535, which references are hereby incorporated in their entirety. The antiblocking agents are preferably added to the outer layers.

Lubricants are higher aliphatic acid amides, higher aliphatic acid esters, waxes and metal soaps and polydimethylsiloxanes. The effective amount of lubricant is in the range from about 0.1 to 3% by weight. Particularly suitable is the addition of higher aliphatic acid amides in the range from about 0.15 to 0.25% by weight in the base layer and/or the outer layers. A particularly suitable aliphatic acid amide is erucamide. The addition of polydimethylsiloxanes is preferred in the range from about 0.3 to 2.0% by weight. Dimethylsiloxanes having a viscosity of from 10,000 to 1,000,000 $mm^2/s$ are especially preferred. Particularly favorable is the addition of polydimethylsiloxanes in one or both outer layers.

Stabilizers which can be employed are conventional compounds which have a stabilizing action for polymers of ethylene, propylene and other α-olefins. Their added amount is between about 0.05 and 2% by weight. Particularly suitable are phenolic stabilizers, alkali metal or alkaline earth metal stearates and/or alkali metal or alkaline earth metal carbonates.

Phenolic stabilizers are preferred in an amount from about 0.1 to 0.6% by weight, particularly from about 0.15 to 0.3% by weight, and having a molecular weight of greater than about 500 g/mol. Pentaerythrityl tetrakis[3-(3,5-di-tert-butyl-4-hydroxyphenyl)propionate] and 1,3,5-trimethyl-2,4,6-tris(3,5-di-tert-butyl-4-hydroxybenzyl)benzene are particularly advantageous.

Neutralizers are preferably calcium stearate and/or calcium carbonate and/or synthetic dihydrotalcite (SHYT) having a mean particle size of at most about 0.7 µm, an absolute particle size of less than 10 µm and a specific surface area of at least about 40 $m^2/g$.

The invention furthermore relates to a process for the production of the multilayer film according to the invention by the coextrusion process, which is known per se. This process is carried out by coextruding the melts corresponding to the individual layers of the film through a flat-film die, taking off the resultant film over one or more rolls for solidification, subsequently biaxially stretching (orienting) the film, heat setting the biaxially stretched film and, if desired, corona-treating the surface layer intended for corona treatment.

The biaxial stretching (orientation) is generally carried out consecutively. Consecutive biaxial stretching, in which stretching is carried out first longitudinally (i.e., in the machine direction) and then transversely (i.e., perpendicular to the machine direction), is preferred.

As is conventional in coextrusion, the polymer or polymer mixture of the individual layers is compressed and liquefied in an extruder, with it being possible for any additives to be already present in the polymer or polymer mixture or added at this time. The melts are then extruded simultaneously through a flat-film die (slot die), and the extruded multilayer film is drawn off over one or more take-off rolls, where it cools and solidifies.

The resultant film is then stretched longitudinally and transversely to the extrusion direction, which results in alignment of the molecule chains. Stretching is preferably from about 4:1 to 7:1 in the longitudinal direction and preferably from about 8:1 to 11:1 in the transverse direction. The longitudinal stretching is expediently carried out with the aid of two rolls running at different speeds corresponding to the desired stretching ratio, and the transverse stretching is expediently carried out with the aid of an appropriate tenter frame.

Biaxial stretching of the film is followed by thermofixing (heat treatment), the film being kept at a temperature from about 140° to 160° C. for about 0.5 to 10 seconds. The film is subsequently wound up in the conventional manner by means of a wind-up unit.

It has proven particularly favorable to keep the take-off roll or rolls at a temperature from about 10° to 100° C., preferably from about 20° to 80° C., by means of a heating and cooling circuit. This serves the purpose of cooling and solidifying the extruded film.

The temperatures at which longitudinal and transverse stretching are carried out can vary in a relatively broad range and depend on the respective composition of the outer layer mixture and on the desired properties of the film or base layer, such as, opacity, whiteness, thickness, density, etc. In general, the longitudinal stretching is preferably carried out at from about 120° to 150° C. and the transverse stretching preferably at about 155° to 190° C.

If desired, one or both surfaces of the film can, as mentioned above, be corona- or flame-treated by one of the known methods after the biaxial stretching. The treatment intensity is generally in the range from about 37 to 42 mN/m, preferably from about 39 to 40 mN/m.

In the case of corona treatment an advantageous procedure is to pass the film between two conductor elements serving as electrodes. A high voltage, usually alternating voltage (from about 10 to 20 kV and from about 20 to 40 kHz), is applied between the electrodes so that spray or corona discharges can occur. The spray or corona discharge ionizes the air above the film surface and reacts with the molecules of the film surface, causing formation of polar inclusions in the essentially non-polar polymer matrix.

For flame treatment with a polarized flame (see U.S. Pat. No. 4,622,237), a direct electric voltage is applied between a burner (negative pole) and a chill roll. The level of the applied voltage is between about 500 and 3,000V, preferably in the range from about 1,500 to 2,000V. The applied voltage gives the ionized atoms increased acceleration, and they hit the polymer surface with greater kinetic energy. The chemical bonds within the polymer molecule are more easily broken, and formation of free radicals proceeds more rapidly. Heating of the polymer using this procedure is substantially less than in the base of standard flame treatment, and films can be obtained in which the heat-sealing properties of the treated side are even better than those of the untreated side.

The multilayer film according to the invention has a combination of properties which make it particularly suitable for its intended use as an opaque label film or as an opaque wrapping film for high-speed wrapping machines.

By means of this film, improvement of the antistatic properties is further achieved by increasing the whiteness of the film to such an extent and in such an economic manner that the full-area printing with the white base color can be omitted. The antistatic properties are also improved by providing the film with the specially selected antistatic in the outer layer. The high whiteness is achieved in an economic manner by incorporating the $TiO_2$ into the interlayer. Significantly lower amounts of pigment are thus required than used for a comparable whiteness due to pigment in the base layer. In this way, the excellent antistatic properties are retained until the colored print image is applied. Furthermore, the antistatic properties are surprisingly hardly impaired even after printing with the colored print image.

In addition, the film offers all the important properties required of packaging films, in particular good, uniform visual properties, good destackability, low density and excellent printability.

In summary, it should be noted that the multilayer film according to the invention is distinguished by a multiplicity of advantageous properties. These advantageous properties include:

excellent destackability,
excellent antistatic properties,
high sheen,
high whiteness (on one or both sides),
high opacity,
homogeneous film appearance,
good heat-sealing properties on one or both sides,
good surface treatability,
good immediate and long-term printability,
high scratch resistance of both surface layers, and
no chalking in the base of a filler-containing outer layer.

The invention is described in greater detail by the examples below:

EXAMPLE 1

A four-layer symmetrical film (layer structure AKZD) was produced, with the following production parameters being observed:

|  | Extrusion temperature |
|---|---|
| Base layer K | 265° C. |
| Outer layers A and D | 275° C. |
| Interlayer Z | 280° C. |

A four-layer prefilm having an asymmetrical layer structure AKZD was extruded. This prefilm was cooled on a chill roll (chill roll temperature 30° C.). Stretching was subsequently carried out, first in the longitudinal direction ($\lambda_1$= 5.5:1; T= 130° C.) and then in the transverse direction ($\lambda_1$= 9:1; T= 160° C., convergence 15%). The machine speed was about 210 m/min.

The film had the following structure: Base layer K:

| 87.88% by weight | of a propylene homopolymer having a melt flow index of 4 g/10 min (230° C., 21.6 N) |
|---|---|
| 12% by weight | of calcium carbonate having a mean particle diameter of 3.5 μm |
| 0.12% by weight | of N,N-bis(hydroxyethyl)-alkylamine (antistatic, Armostat ® 300, AKZO, Düren, Germany) |

The calcium carbonate was employed via a masterbatch (30% by weight of PP, 70% by weight of $CaCO_3$; Multibase® 7012 A, OMYA, Cologne, DE).

Interlayer Z:

| 92.91% by weight | of a propylene homopolymer having a melt flow index of 4 g/10 min (230° C.; 21.6 N) |
|---|---|
| 7% by weight | of $TiO_2$ having a mean |

-continued

| | |
|---|---|
| 0.09% by weight | particle diameter of from 0.2 to 0.3 μm of N,N-bis(hydroxyethyl)-alkylamine (antistatic, Armostat ® 300, AKZO, Düren, Germany). |

The TiO$_2$ is employed via a masterbatch (55% by weight of TiO$_2$; 45% by weight of PP; 8555 LM®; Schulmann, Kerpen, Germany).

Outer layers A and D:

| | |
|---|---|
| 94.5% by weight | of ethylene-propylene co-polymer having a C$_2$ content of 4%, a melt flow index of 12 g/10 min (230° C., 21.6 N) and a degradation factor of 8 |
| 5% by weight | of calcium carbonate having a mean particle diameter of 3.5 μm |
| 0.5% by weight | of N,N-bis(hydroxyethyl)-alkylamine of the formula I |

$$R^1-N\begin{matrix}R^2\\\\R^3\end{matrix}$$

in which
R$^1$ is from 55 to 65% C$_{18}$H$_{35}$
from 30 to 40% C$_{16}$H$_{31}$
from 0 to 5% C$_{14}$H$_{27}$
from 0 to 1% C$_{12}$H$_{23}$
and in which
R$^2$ is CH$_2$-CH$_2$OH and
R$^3$ is CH$_2$CH$_2$OH.

| | |
|---|---|
| Film thickness: | 80 μm |
| Layer K thickness: | 72 μm |
| Layer Z thickness: | 6 μm |
| Outer layers A and D thickness: | 1 μm |

An outer layer was corona-treated with 41 mN/m. The film had the properties according to the invention given in the table.

EXAMPLE 2

A four-layer film was produced as described in Example 1, but the outer layer D contained no CaCO$_3$.

EXAMPLE 3

A four-layer film was produced as described in Example 1, but the outer layer D contained no antistatic and no CaCO$_3$.

EXAMPLE 4

A four-layer film was produced as described in Example 1, but both the outer layers contained an N,N-bis(hydroxyethyl)oleylamine in an amount of 0.5% by weight instead of the amine of the formula I as described in Example 1.

COMPARATIVE EXAMPLE 1

A four-layer film was produced as described in Example 1, but both the outer layer contained an unhydrogenated N,N-bis(hydroxyethyl)alkylamine (Armostat® 300, AKZO, Düren, DE) instead of an amine of the formula I as described in Example 1.

COMPARATIVE EXAMPLE 2

A four-layer film was produced as described in Example 1, but both outer layers contained no amine.

COMPARATIVE EXAMPLE 3

A four-layer film was produced as described in Example 1, but both outer layers contained no CaCO$_3$.

COMPARATIVE EXAMPLE 4

A four-layer film was produced as described in Example 1, but both the outer layers contained a PP homopolymer instead of the copolymers.

The raw materials and films were characterized using the following measurement methods:

Melt Flow Index

The melt flow index was measured in accordance with DIN 53 735 at a load of 21.6N and 230° C.

Melting Point

DSC measurement, maximum of the melting curve, heating rate 20° C./min.

Viscosity Index J

The viscosity index is a measure of the molecular weight. The viscosity index is measured in accordance with DIN 53 728, Part 4, in 0.1% strength decahydronaphthalene solution at 135° C.

Density σ

The density is determined in accordance with DIN 53 479, Method A.

Gloss

The gloss was determined in accordance with DIN 67 530. The reflector value was measured as an optical parameter for the surface of a film. In accordance with the standards ASTM-D 523-78 and ISO 2813, the angle of incidence was set at 60° or 85°. A light beam hits the planar test surface at the set angle of incidence and is reflected or scattered thereby. The light beams incident on the photoelectronic receiver are indicated as a proportional electrical quantity. The measurement value is dimensionless and must be specified together with the angle of incidence.

Seal Seam Strength

For the determination, two film strips 15 mm in width were placed one on top of the other and heat-sealed at 30° C. for 0.5 second at a pressure of 10N/cm$^2$ (equipment used: Brugger NDS, with sealing jaws heated on the one side). The seal seam strength was determined by the T-peel method.

Roughness

The roughness was determined according to DIN 4768.

Friction

The friction was determined in accordance with DIN 53 375.

Surface Tension

The surface tension was determined by the ink method (DIN 53 364).

Printability

The corona-treated films were printed 14 days after production (short-term assessment) and 6 months after production (long-term assessment). The ink adhesion was assessed by an adhesive-tape test. If a small amount of ink was removable by means of an adhesive tape, the ink adhesion was assessed as being moderate, and if a significant amount of ink was removed, it was assessed as being poor.

Water-Vapor Barrier Action

The water-vapor barrier action is measured in accordance with DIN 53 122 at 23° C. and 85% relative atmospheric humidity and indicates the amount of water in grams which has passed through per square meter and per day.

Opacity and Whiteness

The opacity and whiteness are determined with the aid of an "ELREPHO" electric remission photometer from Zeiss, Oberkochen (DE), standard illuminant C, 2° standard observer. The opacity is determined in accordance with DIN 53 146. The whiteness is defined as $W = RY + 3RZ - 3RX$, where $W$= whiteness, RY, RZ and RX= corresponding reflection factors when the Y, Z and X color measurement filters respectively are used. The white standard used is a barium sulfate compact (DIN 5033, Part 9). A detailed description is given, for example, in Hansl Loos, "Farbmessung" [Color Measurement], Verlag Beruf und Schule, Itzehoe (1989).

Light Transparency

The light transparency is measured in accordance with ASTM-D 1003-77.

Tables 1 and 2 below show the properties and structure of the multilayer polypropylene films of the examples.

TABLE 1

| Example | Base layer | Inter layer | Outer layer Side A | Outer layer Side D |
| --- | --- | --- | --- | --- |
| E1 | 87.88% by wt. of PP, 12% by wt. of CaCO$_3$, 0.12% by wt. of Armostat 300 | 92.91% by wt. of PP, 7% by wt. of TiO$_2$, 0.09% by wt. of Armostat 300 | 94.5% by wt. of copolymer, 5% by wt. of CaCO$_3$, 0.5% by wt. of N,N-bis(hydroxyethyl)alkyl-amine of the formula I | 94.5% by wt. of copolymer, 5% by wt. of CaCO$_3$, 0.5% by wt. of N,N-bis(hydroxyethyl)alkyl-amine of the formula I |
| E2 | as in E1 | as in E1 | as in E1 | 99.5% by wt. of copolymer, 0.5% by wt. of N,N-bis(hydroxyethyl)alkyl-amine of the formula I |
| E3 | as in E1 | as in E1 | as in E1 | 100% by wt. of copolymer |
| E4 | as in E1 | as in E1 | 94.5% by wt. of copolymer, 5% by weight of CaCO$_3$, 0.5% by wt. of N,N-bis(hydroxy-ethyl)oleylamine | 94.5% by wt. of copolymer, 5% by weight of CaCO$_3$, 0.5% by wt. of N,N-bis(hydroxy-ethyl)oleylamine |
| CE1 | as in E1 | as in E1 | 94.5% by wt. of copolymer, 5% by wt. of CaCO$_3$, 0.5% by wt. of unhydrogentated N,N-bis(hydroxy-ethyl)alkylamine (Armostat ® 300) | 94.5% by wt. of copolymer, 5% by wt. of CaCO$_3$, 0.5% by wt. of unhydrogentated N,N-bis(hydroxy-ethyl)alkylamine (Armostat ® 300) |
| CE2 | as in E1 | as in E1 | 95% by wt. of copolymer, 5% by wt. of CaCO$_3$ | 95% by wt. of copolymer, 5% by wt. of CaCO$_3$ |
| CE3 | as in E1 | as in E1 | 99.5% by wt. of copolymer, 5% by wt. of N,N-bis(hydroxy-ethyl)alkylamine of the formula I | 99.5% by wt. of copolymer, 0.5% by wt. of N,N-bis(hydroxy-ethyl)alkylamine of the formula I |
| CE4 | as in E1 | as in E1 | 94.5% by wt. of PP, 5% by wt. of CaCO$_3$, 0.5% by wt. of N,N-bis(hydroxy-ethyl)alkylamine of the formula I | 94.5% by wt. of PP, 5% by wt. of CaCO$_3$, 0.5% by wt. of N,N-bis(hydroxy-ethyl)alkylamine of the formula I |

TABLE 2

| Examples | Destack-ability | Surface resistance | Chalking | Heat-sealability |
|---|---|---|---|---|
| Example 1 | ++ | ++ | ++ | + |
| Example 2 | + | ++ | ++ | + |
| Example 3 | + | + | ++ | + |
| Example 4 | ++ | ++ | ++ | + |
| Comp. Example 1 | 0 | − | ++ | + |
| Comp. Example 2 | 0 | — | ++ | + |
| Comp. Example 3 | — | + | ++ | + |
| Comp. Example 4 | − | ++ | — | — |

++ = very good
+ = good
0 = moderate
− = poor
— = very poor

What is claimed is:

1. A heat-sealable, biaxially oriented, opaque, multilayer polypropylene film comprising a base layer which comprises a propylene polymer or a propylene polymer mixture and filler; at least one interlayer arranged thereon; and at least one heat-sealable outer layer arranged on the interlayer, wherein the outer layer comprises a combination of about 2 to 8% by weight based on the weight of the outer layer of inorganic and/or organic particles and a tertiary aliphatic amine of the formula I:

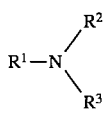

in which

R$^1$ is an alkyl radical having at least 18 carbon atoms and less than about 10% of shorter chain lengths based on the total amount of amine or an essentially fully saturated alkyl radical having 8 to 26 carbon atoms, and R$^2$ and R$^3$ are identical or different and are R$^4$-CH$_2$OH, in which R$^4$ is an essentially saturated C$_1$-C$_6$-alkyl radical, and wherein the interlayer comprises a propylene polymer or a propylene polymer mixture and pigments.

2. A heat-sealable film as claimed in claim 1, wherein the outer layer contains from about 0.05 to 2% by weight of the tertiary aliphatic amine of the formula I based on the weight of the outer layer.

3. A heat-sealable film as claimed in claim 1, wherein the outer layer contains inorganic particles, having a particle size of from about 2 to 5 μm.

4. A heat-sealable film as claimed in claim 1, wherein the filler of the base layer is the same composition as the inorganic and/or organic particles of the outer layer.

5. A heat-sealable film as claimed in claim 1, wherein the thickness of the outer layer is from about 0.5 to 2 μm.

6. A multilayer polypropylene film as claimed in claim 1, wherein the filler of the base layer comprises at least one of vacuole-inducing solid particles having a mean particle diameter of ≧ about 1 μm and pigments having a mean particle diameter of < about 1 μm.

7. A multilayer polypropylene film as claimed in claim 6, wherein the solid particles are CaCO$_3$ or incompatible polymers, and the pigments are TiO$_2$.

8. A multilayer polypropylene film as claimed in claim 1, wherein the filler of the base layer consists of pigments, in an amount from about 2 to 25% by weight, and wherein the density of the film is ≧ about 0.9 g/cm$^3$.

9. A multilayer polypropylene film as claimed in claim 8, wherein the pigments are TiO$_2$.

10. A multilayer polypropylene film as claimed in claim 1, wherein the filler of the base layer consists of solid particles, in an amount from about 1 to 25% by weight, and wherein the density of the film is from about 0.4 to 0.85 g/cm$^3$.

11. A multilayer polypropylene film as claimed in claim 10, wherein the solid particles are CaCO$_3$.

12. A multilayer polypropylene film as claimed in claim 10, wherein the solid particles in the base layer are present in an amount from about 2 to 5% by weight, and wherein the density of the film is from about 0.7 to 0.85 g/cm$^3$.

13. A multilayer polypropylene film as claimed in claim 10, wherein the solid particles are present in the base layer in an amount from about 9 to 14% by weight, and wherein the density of the film is from about 0.4 to 0.7 g/cm$^3$.

14. A multilayer polypropylene film as claimed in claim 1, wherein the filler of the base layer comprises solid particles, in an amount from about 1 to 10% by weight and pigments in an amount from about 1 to 7% by weight, and wherein the density of the film is from about 0.6 to 0.85 g/cm$^3$.

15. A multilayer polypropylene film as claimed in claim 1, wherein the propylene polymer of the interlayer has a melting point of at least about 140° C. and the melt flow index is in the range from about 0.5 to 15 g/10 min.

16. A multilayer polypropylene film as claimed in claim 1, wherein the pigments of the interlayer have a mean particle diameter of <1 μm and are present in an amount from about 2 to 25% by weight.

17. A multilayer polypropylene film as claimed in claim 1, wherein the interlayer further comprises resin having a melting point from about 100° to 180° C. in an amount from about 1 to 30% by weight.

18. A multilayer polypropylene film as claimed in claim 1, wherein said film is shaped as a label.

* * * * *